United States Patent Office 2,697,496
Patented Dec. 21, 1954

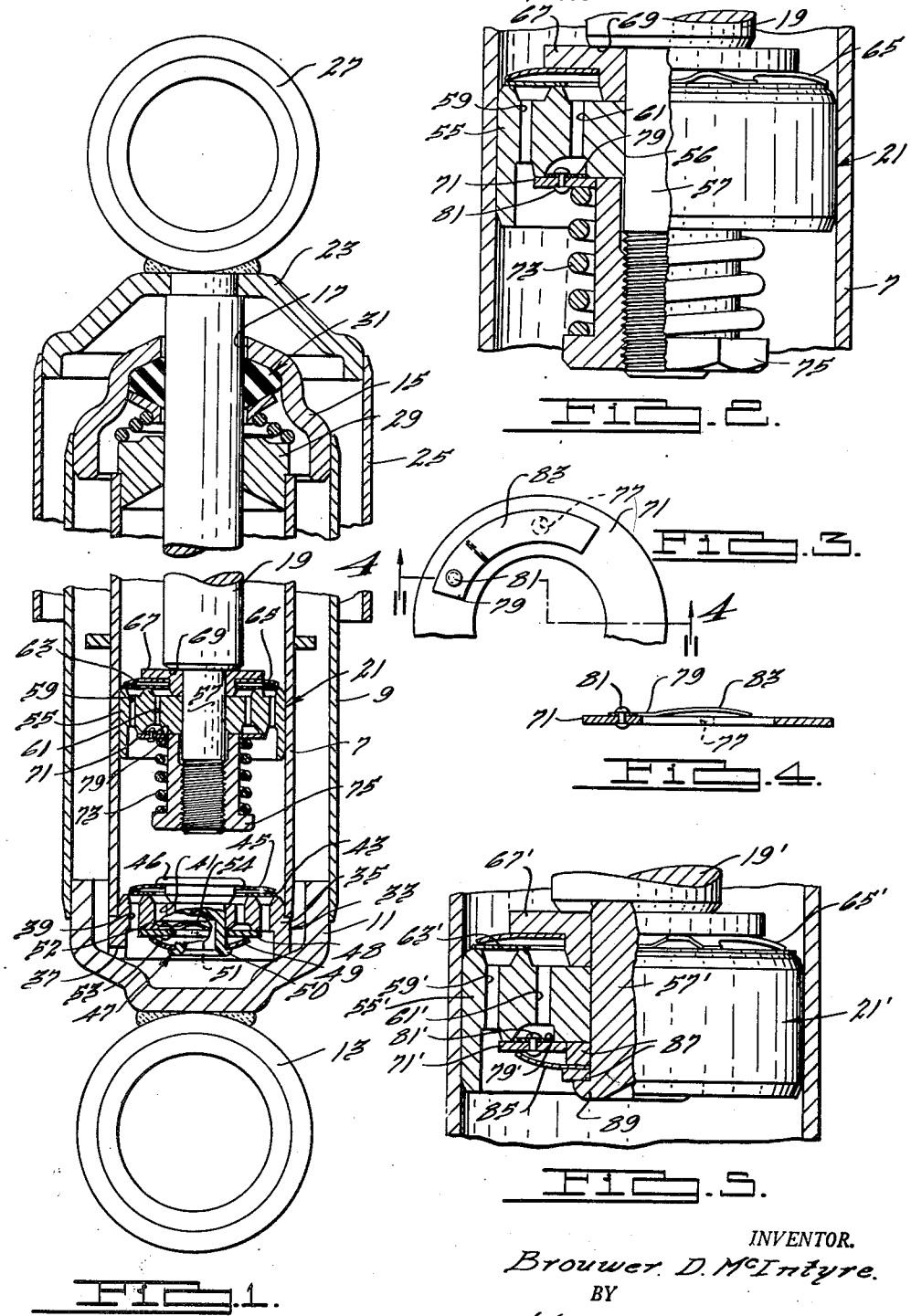

2,697,496

SHOCK ABSORBER VALVE CONSTRUCTION

Brouwer D. McIntyre, Monroe, Mich., assignor to Patent Development Company, Monroe, Mich., a partnership Application March 14, 1950, Serial No. 149,475

6 Claims. (Cl. 188—88)

This invention relates generally to hydraulic direct-acting shock absorbers, and more particularly to improved valve constructions for such shock absorbers.

It is an object of this invention to provide improved shock absorber piston and base valve constructions having valve means associated therewith for controlling the flow of fluid therethrough in one direction, and an orifice normally permitting the flow of fluid therethrough in the one direction, which is adapted to be gradually closed as the pressure of the shock absorber fluid increases.

It is a still further object of this invention to provide a piston and base valve construction for a shock absorber of the aforementioned type, which will provide more efficient shock absorber control, on both the rebound and compression stroke of the shock absorber, so that at relatively low fluid pressures and velocities, relatively light resistance or control will be provided, and so that at high fluid pressures and velocities increasingly higher resistance control will be provided, thus providing exceptionally efficient and desirable shock absorber control.

It is a still further object of this invention to provide a hydraulic shock absorber of the aforementioned type, which is relatively simple and inexpensive in construction, durable in operation, and extremely efficient in providing the proper shock absorber control in the desired manner.

These and other objects of this invention will become apparent from the following detailed description, taken in conjunction with the accompanying drawing, in which:

Figure 1 is a longitudinal sectional view of a shock absorber incorporating the piston construction of this invention;

Fig. 2 is an enlarged fragmentary view, partially in section and partially in elevation, of the piston construction and adjacent parts of the shock absorber illustrated in Fig. 1;

Fig. 3 is a fragmentary plan view of the rebound control plate element illustrated in Fig. 2;

Fig. 4 is a sectional view of the structure illustrated in Fig. 3, taken along the line 4—4 thereof; and Fig. 5 is a fragmentary view, partially in section and partially in elevation, similar to Fig. 2, illustrating a further embodiment of the invention.

While the piston and base valve constructions of this invention may be used in various types of shock absorber constructions, they are illustrated in conjunction with a hydraulic, direct-acting, tubular shock absorber of the type shown, which includes a tubular member 7, forming the pressure cylinder of the shock absorber, and a second tubular member 9, surrounding the first tubular member and cooperating therewith to form a reserve chamber. The lower end of the tubular member 9 is closed by means of an end cap 11, having an attaching ring 13 connected therewith for securing one end of the shock absorber to a portion of a vehicle or the like. The upper end of the tube 9 is closed by means of an end cap 15, which has its base portion apertured at 17 to slidably receive a piston rod 19, the lower end of which is connected with a piston 21. The upper end of the piston rod 17, beyond the end cap 15, projects through an end cap 23, which in turn has a depending tube 25 connected therewith, which is concentric with the tubes 7 and 9, and acts as a shield therefor. An attaching ring 27 is connected with the upper end of the piston rod and the base portion end of the cap 23, and is adapted to be connected with another part of a vehicle, or the like, so that the piston, piston rod and attaching ring 27 are movable axially of the tubes 7 and 9 and the attaching ring 13.

The upper end of the pressure tube 7 is closed by means of a piston rod guide member 29, and a piston rod seal assembly 31 is disposed between the rod guide 29 and the end cap 15. The lower end of the pressure tube 7 is closed by means of a base valve assembly 33, which includes a valve body 35, the lower end of which engages the end cap 11 and is suitably notched or recessed at 37 to permit fluid to flow between the reserve chamber and the pressure cylinder. The base valve body 35 is provided with an outer set of circumferentially spaced passageways 39 and an inner set of circumferentially spaced passageways 41. The upper ends of the passageways 39 are normally closed against a flow of fluid therethrough by means of a disk 43, which is yieldably held in engagement with the valve body 35 by means of a star spring 45. The star spring is loaded by means of a head portion 46 of a rivet 47, which extends through a central aperture in the valve body 35. The disk 43 is adapted to be actuated by relatively light fluid pressure, so that fluid may quite readily flow from the reserve chamber into the lower portion of the pressure cylinder, as will hereinafter appear. The lower ends of the valve body passageways 41 are normally closed by a disk or plate 48, which is yieldably held in engagement with the under side of the valve body 35 by suitable spring means, such as spring washer 49. The spring washer 49 is loaded by means of a spun over flange 50 on the lower end of the rivet 47. The disk 48 provides the primary compression control for the shock absorber and is movable away from the valve body to control the flow of fluid from the pressure cylinder to the reserve chamber.

The disk or plate 48 is provided with an orifice 51 therein which normally permits fluid to flow downwardly through the passageways 41 and into the reserve chamber. A leaf spring-like member 52 is mounted on the upper surface of the plate or disk 48, and is connected therewith by any suitable means, such as a rivet 53. The leaf spring 52 includes an arcuately bowed portion 54 which extends over the top of orifice 51 and engages the disk 48 on opposite sides of the orifice, so as to normally permt fluid to flow through the orifice. The bowed portion 54 is, however, adapted to be actuated or deflected by fluid under pressure and gradually moved or deflected toward the top surface of the disk or plate 48, so as to gradually close the orifice 51 and completely close the orifice at a predetermined fluid pressure.

The piston 21 includes a body 55 which has a central aperture 56 therethrough, through which the reduced lower end 57 of the piston rod 19 extends. The piston body 55 includes an outer set of circumferentially spaced passageways 59 and an inner set of circumferentially spaced passageways 61. The upper ends of the passageways 59 are normally closed by a disk 63, which is yieldably held in engagement with the upper face of the piston body 55 by means of a star spring 65. The star spring is loaded by means of a spacer washer 67, which is disposed between the upper face of the piston body 55 and a shoulder 69, at the upper end of the piston rod reduced portion 57. The disk 63 permits a flow of fluid upwardly through the passageways 59, so as to maintain the upper portion of the cylinder completely filled with fluid at all times. A plate element 71 engages the under side of the piston body 55, adjacent the passageways 61, so as to be adapted to prevent a flow of fluid through the passageways 61 from the upper side of the pressure cylinder to the lower side thereof. The plate 71 is yieldably retained in engagement with the piston body 55 by means of a coil spring 73, the upper end of which engages the plate element 71, and the lower end of which engages the head of a nut element 75, which is threaded on the lower end of the piston rod reduced portion 57, and which retains the piston and piston rod in an assembled relationship.

The plate element 71 is provided with an orifice 77 therein, which normally permits fluid to flow downwardly through the passageways 61 to the lower portion of the pressure cylinder. A leaf springlike member 79 is disposed on the upper surface of the plate element 71 and connected therewith by any suitable means, such as a rivet 81. The leaf spring element 79 includes an arcuately bowed portion 83, which extends over the top of the orifice 77 and engages the plate on opposite sides of the orifice so as to normally permit fluid to flow through the orifice. The bowed portion 83 is, however, adapted to be actuated or deflected by fluid under pressure and gradually moved or deflected toward the top surface of the plate element 71 so as to gradually close the orifice 77 and completely close the orifice at a predetermined fluid pressure.

When the piston unit 21 moves downwardly in the pressure cylinder 77, fluid will flow upwardly through the piston passageways 59, past the disk 63, so as to maintain the upper portion of the pressure cylinder completely filled with fluid at all times. Fluid displaced because of the area of the piston rod 19 in the upper portion of the cylinder, will flow downwardly through the base valve passageways 41 and orifice 51 into the reserve chamber until the orifice is closed by the spring member 52 by a predetermined fluid pressure or velocity. The plate or disk 48 will move away from the base valve body 35 at a predetermined pressure, which may or may not be greater than the pressure required to completely close orifice 51, to allow the fluid in the pressure cylinder to flow past the valve disk 48 and into the reserve chamber.

When the piston unit 21 moves upwardly in the pressure cylinder, fluid will flow downwardly through the piston passageways 61 and through the orifice 77 in the plate element 71. When the fluid pressure or velocity begins to increase, the leaf spring 79 will gradually close the orifice 77 and will completely close the same at a predetermined fluid pressure or velocity. When the fluid pressure reaches a predetermined value, the plate element 71 will move downwardly against the action of the spring 73, and thus permit the flow of fluid past the plate element into the lower portion of the pressure cylinder. Simultaneously fluid will flow from the reserve chamber to the lower portion of the pressure cylinder through the base valve passageways 39 and past the valve disk 43, so as to replenish the lower portion of the pressure cylinder.

It will thus be appreciated that at relatively low fluid pressures and velocities fluid can flow through the piston and base valve orifices 77 and 51 respectively, so as to provide relatively soft resistance or light control on both the rebound and compression strokes of the shock absorber at such velocities and pressures. However, as the fluid pressures and velocities increase, the orifices will be gradually closed and finally completely closed, so as to provide a stronger and more efficient control at such pressures and velocities. The plate elements 71 and 48 will be actuated and moved away from their respective valve bodies to permit the flow of fluid therepast, either after the orifices 77 and 51 are completely closed, or when they are partially closed, in accordance with the shock absorber control desired at relatively high fluid pressures and velocities, or when the shock absorber is subjected to a sudden impact. Thus, the piston and base valve constructions provide the desired shock absorber control at both high and low fluid pressures and velocities, so that the shock absorber will not be over controlled at low piston velocities, or under controlled at high piston velocities. Such shock absorber control materially enhances the riding characteristics of a vehicle on which the shock absorber is mounted, and aids in the obtainance of maximum riding comfort during both boulevard vehicle driving and "washboard" road driving. It is well known that during boulevard driving the shock absorber piston velocities are relatively low and during "washboard" road driving the piston velocities are relatively high. The valve constructions of this invention permit the shock absorber control to vary with the velocity of the piston, and therefore enable the obtainance of a good vehicle ride on all types of surfaces.

The embodiment of the invention illustrated in Fig. 5 is substantially identical to that previously described, except that the piston plate element 71' is yieldably retained in engagement with the piston body 54' by means of a spring or "Belleville" washer 85, the outer periphery of which engages the plate element 71' and the inner portion of which is held between washers 87, which are sleeved on the reduced lower end 57' of the piston rod 19' and which are held in position by spun over flange 89 on the lower end of the piston rod portion 57'. The piston construction of this embodiment operates in the same manner as that previously described.

What is claimed is:

1. A valve construction for a hydraulic shock absorber including a valve body having a passageway therein through which fluid may flow from one side of said body to the other side thereof, a plate element engageable with said body to prevent a flow of fluid through said passageway in one direction, yieldable means engaging said plate element and normally retaining the latter in engagement with said body and actuatable under a predetermined fluid pressure to permit said plate element to move away from said body, said plate element having an orifice therein normally permitting a flow of fluid from said passageway therethrough, and a leaf spring member connected with said plate element normally permitting a flow of fluid through said orifice and deflectable to close said orifice and prevent a flow of fluid therethrough prior to the actuation of said plate element.

2. A valve construction for a hydraulic shock absorber, including a valve body having a passageway through which fluid may flow from one side of said body to the other side thereof, a plate element engageable with said body and adapted to prevent a flow of fluid through said passageway in one direction, means yieldably maintaining said plate element in engagement with said valve body and actuatable under a predetermined fluid pressure to permit said plate element to move away from said valve body and permit a flow of fluid therepast, said plate element having an orifice therein normally permitting a flow of fluid from said passageway therethrough, and means actuatable by fluid pressure for gradually closing said orifice and completely closing the same at a predetermined fluid pressure, said means including a yieldable member connected with said plate element.

3. In a hydraulic shock absorber having a pressure cylinder, a piston unit slidably disposed therein, said piston unit including a body having an opening therein, a piston rod having one end thereof extending through said opening, said body having a passageway therein through which fluid may flow from one side of said piston to the other side thereof, a plate element engageable with said body and adapted to prevent a flow of fluid through said passageway in one direction, spring means engaging said plate element and supported by said piston rod for yieldably urging said plate element into engagement with said body and yieldable under a predetermined fluid pressure to permit said plate element to move away from said body and permit a flow of fluid therepast, said plate element having an orifice therein normally permitting a flow of fluid from said passageway therethrough, and a yieldable member mounted on said plate element and adapted to gradually close said orifice under fluid pressure and completely close the same at a predetermined fluid pressure.

4. A hydraulic shock absorber including a pressure cylinder, means providing a reserve chamber adjacent said pressure cylinder, a piston assembly slidably disposed in said pressure cylinder, means closing one end of said pressure cylinder, a piston rod connected with said piston assembly and extending through one end of said pressure cylinder, a base valve assembly closing the opposite end of said pressure cylinder and communicating with the reserve chamber, said piston assembly including a body, said body having a passageway therein through which fluid may flow from one side of said piston to the other side thereof, yieldable valve means engageable with said body and adapted to prevent a flow of fluid through said passageway in one direction, said valve means being yieldable under a predetermined fluid pressure to move relative to said body and permit a flow of fluid therepast, said valve means having an orifice therein normally permitting a flow of fluid from said passageway therethrough, a yieldable member connected with said valve means and adapted to gradually close said orifice under fluid pressure and completely close the same at a predetermined fluid pressure, said base valve assembly including a body having a passageway therein through which fluid may flow from one side of said base valve to the other side thereof, yieldable valve means engageable with said body and adapted to prevent a flow of fluid through said passageway in one direction, said valve means being yieldable under a predetermined fluid pressure to move relative to said body and permit a flow of fluid therepast, said valve means having an orifice normally permitting a flow of fluid from said base valve passageway therethrough, and a yieldable member connected with said valve means and adapted to gradually close said orifice under fluid pressure and completely close the same at a predetermined fluid pressure.

5. A hydraulic shock absorber including a pressure cylinder and a reserve chamber, a piston assembly slidably disposed in said pressure cylinder, means closing one end of said pressure cylinder, a piston rod connected with said piston assembly and having one end thereof projecting through said pressure cylinder closing means, a base valve assembly closing the opposite end of said pressure cylinder and communicating with said reserve chamber, said piston and base valve assemblies each including a body having a passageway therein through which fluid may flow from one side of said body to the other side thereof, means normally closing said passageway against the flow of fluid therethrough in one direction and yieldable under a predetermined fluid pressure to move relative to said body and permit fluid to flow therepast, orifice means normally permitting a flow of fluid through the valve body in said one direction, and means actuatable by fluid pressure for gradually closing said orifice and completely closing the same at a predetermined fluid pressure.

6. A hydraulic shock absorber including a pressure cylinder and a reserve chamber, a piston assembly slidably disposed in said pressure cylinder, means closing one end of said pressure cylinder, a piston rod connected with said piston assembly and having one end thereof extending through said pressure cylinder closing means, a base valve assembly closing the opposite end of said pressure cylinder and communicating with said reserve chamber, said piston assembly including a body having a passageway therein through which fluid may flow from the portion of said pressure cylinder between said piston assembly and said pressure cylinder closing means to the opposite side of said piston assembly, a valve element engageable with said body and adapted to prevent a flow of fluid through said passageway in said one direction, means yieldably retaining said valve element in engagement with said body, whereby said valve element may be actuated by fluid under a predetermined pressure so as to move relative to said body and permit a flow of fluid therepast, said valve element having an orifice therein normally permitting a flow of fluid from said passageway therethrough, a yieldable member connected with said valve element and adapted to gradually close said orifice under fluid pressure and completely close the same at a predetermined fluid pressure, said base valve assembly including a body having a pasageway therein through which fluid may flow from said pressure cylinder to said reserve chamber, a valve element engageable with said base valve body and adapted to prevent a flow of fluid through said base valve passageway in said one direction, means yieldably retaining said valve element in engagement with said base valve body so that said valve element may be actuated by fluid under a predetermined pressure so as to move relative to said base valve body and permit a flow of fluid therepast, said base valve element having an orifice therein normally permitting a flow of fluid from said base valve passageway therethrough, a yieldable member connected with said base valve element and adapted to gradually close said orifice under fluid pressure and completely close the same at a predetermined fluid pressure, and means associated with said piston and base valve assemblies for controlling the flow of fluid through said assemblies in the opposite direction from the flow through said passageways, whereby variable shock absorber control or resistance on both the rebound and compression strokes of said piston will be provided which will vary in accordance with fluid pressure and velocity.

References Cited in the file of this patent

UNITED STATES PATENTS

| Number | Name | Date |
|---|---|---|
| 1,320,060 | Jenney | Oct. 28, 1919 |
| 1,865,460 | Elsey | July 5, 1932 |
| 2,159,289 | Nickelson | May 23, 1939 |
| 2,191,636 | Walker | Feb. 27, 1940 |
| 2,239,112 | Nickelson | Apr. 22, 1941 |
| 2,240,644 | Focht | May 6, 1941 |
| 2,320,314 | Trask | May 25, 1943 |
| 2,352,401 | O'Conner | June 27, 1944 |
| 2,458,157 | Funkhouser | Jan. 4, 1949 |
| 2,467,098 | Rossman | Apr. 12, 1949 |
| 2,481,088 | Cuskie | Sept. 6, 1949 |
| 2,527,034 | Rossman | Oct. 24, 1950 |
| 2,551,749 | Lewton | May 8, 1951 |
| 2,565,617 | Mercier et al. | Aug. 28, 1951 |